(12) United States Patent
Shekhar et al.

(10) Patent No.: US 10,754,735 B2
(45) Date of Patent: Aug. 25, 2020

(54) DISTRIBUTED STORAGE RESERVATION FOR RECOVERING DISTRIBUTED DATA

(71) Applicant: salesforce.com, inc., San Francisco, CA (US)

(72) Inventors: Rohit Shekhar, Sunnyvale, CA (US); Francis Zhang, Edmonton (CA)

(73) Assignee: salesforce.com, inc., San Francisco, CA (US)

( * ) Notice: Subject to any disclaimer, the term of this patent is extended or adjusted under 35 U.S.C. 154(b) by 247 days.

(21) Appl. No.: 15/817,592

(22) Filed: Nov. 20, 2017

(65) Prior Publication Data

US 2019/0155698 A1    May 23, 2019

(51) Int. Cl.
G06F 11/14 (2006.01)

(52) U.S. Cl.
CPC ...... G06F 11/1469 (2013.01); G06F 11/1451 (2013.01); G06F 11/1456 (2013.01); G06F 11/1464 (2013.01); G06F 2201/80 (2013.01); G06F 2201/805 (2013.01); G06F 2201/82 (2013.01); G06F 2201/84 (2013.01)

(58) Field of Classification Search
CPC ............. G06F 11/1469; G06F 11/1451; G06F 11/1456
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

U.S. Appl. No. 13/986,251, filed Apr. 16, 2013.

*Primary Examiner* — Yolanda L Wilson
(74) *Attorney, Agent, or Firm* — Dergosits & Noah LLP; Todd A. Noah

(57) ABSTRACT

Distributed storage reservation for distributed data recovery is described. A system identifies a total number of connected computers, a storage capacity of each connected computer, and a maximum storage capacity of the identified storage capacities of the connected computers. The system determines a reserved storage capacity based on the maximum storage capacity and a reduced total number of the connected computers. The system provisions the reserved storage capacity in each connected computer. The system stores replicas of a database on the connected computers and on multiple computers, the multiple computers being the same as or different than the connected computers. The system identifies that a connected computer storing a replica of the database is unavailable. The system restores a replica of the database from at least one computer storing one replica to the reserved storage capacity in each of multiple available connected computers.

20 Claims, 9 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,416,894 B2* | 9/2019 | Sivasubramanian ... G06F 3/065 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015416 A1* | 1/2005 | Yamagami .......... G06F 11/1471 |
| 2005/0050555 A1 | 3/2005 | Exley et al. |
| 2005/0091098 A1 | 4/2005 | Brodersen et al. |
| 2006/0112300 A1* | 5/2006 | Noya .................. G06F 11/1435 |
| | | 714/6.21 |
| 2008/0104139 A1* | 5/2008 | Xu ........................ G06F 3/0608 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0271485 A1* | 10/2009 | Sawyer .................... G06F 3/061 |
| | | 709/206 |
| 2010/0100677 A1* | 4/2010 | McKean ............... G06F 3/0611 |
| | | 711/114 |
| 2010/0169595 A1* | 7/2010 | Bryant-Rich ....... G06F 11/1458 |
| | | 711/162 |
| 2011/0055161 A1* | 3/2011 | Wolfe ................... G06F 16/245 |
| | | 707/652 |
| 2011/0202735 A1* | 8/2011 | Kono .................. G06F 11/1451 |
| | | 711/162 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0282976 A1* | 10/2013 | Dubnicki ................ G06F 12/00 |
| | | 711/112 |
| 2014/0201483 A1* | 7/2014 | Min ...................... G06F 3/0683 |
| | | 711/162 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0112936 A1* | 4/2015 | Cai ..................... H04L 67/1097 |
| | | 707/639 |
| 2015/0172563 A1 | 6/2015 | Jakobson et al. |
| 2018/0074913 A1* | 3/2018 | Endo ................... G06F 3/0619 |

* cited by examiner

US 10,754,735 B2

DISTRIBUTED STORAGE RESERVATION FOR RECOVERING DISTRIBUTED DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Cloud computing is an information technology paradigm, and a model for enabling ubiquitous access to shared pools of configurable resources (such as computer networks, servers, data storage, applications and services), which may be rapidly provisioned with minimal management effort, often over the Internet. Cloud computing allows users and enterprises with various computing capabilities to store and process data either in a privately-owned cloud, or on third-party servers located in data centers, thus making data-accessing mechanisms more efficient and reliable.

A distributed database can be an organized collection of information that is dispersed over a network of interconnected computers, which may be referred to as a cluster of nodes, such as a cloud computing network. A high availability distributed database system provides continued access to data in a database even after a failure of a node that stores a copy of the database results in the node becoming unavailable for access by an end user. For example, if each of three nodes store a copy (or replica) of a database, after the failure of one node, the end users can still access the data in the database through one of the other available nodes that stores a replica of the database. Further to this example, the three nodes that store the three replicas of the database may be distributed across three fault domains of nodes, such as three racks of nodes that each shares a single point of failure. Consequently, if a rack of nodes, which includes a node that stores a replica of a database, is affected by a single point of failure, such as a power outage or a loss of network access that results in a failure for all nodes in the rack, the end users can still access the data in the database through one of the other racks that includes one of the other available nodes that stores a replica of the database. A replication process ensures that a distributed database remains up-to-date and current by identifying changes in one replica of the database and propagating the changes to the other replicas of the database.

As a distributed database system grows in scale, the probability of a single node failure becomes increasingly likely. While a single node failure may not lead to immediate data loss or data unavailability, such a failure affects the probability of data loss, as presented in "Probability of Data Loss in Large Clusters," by Martin Kleppmann (http://martin.kleppmann.com/2017/01/26/data-loss-in-large-clusters.html). The probability of data loss depends upon the number of nodes in a cluster of nodes, and the probability of a node failure. The final formula presented is:

$$\text{Probability of Data Loss} = kp^r$$

where k~number of partitions in a cluster of nodes, p is the probability of a node failure, which is based on a time window equal to the recovery time of a node, and r is the replication factor of the data, or how many copies are replicated for each data element. Kleppmann's article assumes a constant probability p of a node failure. Distributed database systems attempt to minimize the probability of simultaneous node failure by reducing the recovery time window, such that for a given cluster size (the number of partitions) and replication factor, the probability of data loss decreases with the decrease in recovery time from a node failure.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

In a distributed database system's cluster of nodes, the data of a single node is replicated to multiple other nodes. Therefore, during data recovery following a node failure, the multiple other nodes can participate in generating the data for the failed node, thereby improving the recovery performance. Calculations and experiments suggest that recovery performance is further improved, thereby further reducing recovery time, if data is recovered to multiple nodes instead of recovered to only one new node.

The speed of data recovery is dependent on the net recovery Input/Output (I/O) bandwidth, which is sometimes capped by a quality-of-service engine to protect the primary I/O bandwidth, and the amount of the data that needs to be recovered. Since the amount of data being recovered is usually outside of the control of a recovery process, the recovery bandwidth is the area of interest.

The net recovery bandwidth depends upon the source(s) and the destination(s) recovery bandwidths. Thus, an effective strategy for distributed data recovery is to increase the minimum of the two bandwidths. If r is the net recovery bandwidth, then $r=\min(r_{source(s)\ bandwidth}, r_{destination(s)\ bandwidth})$. For both multiple destinations and single destination recovery, every source node will contribute to the source recovery bandwidth. The difference is between the destination recovery bandwidth consisting of a just a single destination node versus having multiple destination nodes participating in the destination recovery bandwidth. For simplicity's sake, the cluster of nodes is assumed to have symmetric nodes, which means that every node has equal bandwidth and storage capacity. If b is the full duplex bandwidth of a single node, $f_{recovery}$ is the fraction of bandwidth used in recovery, and $t_{single\ destination}$ and $t_{multiple\ destinations}$ are the times in seconds to recover from single node failure, for a single destination and multiple destinations, respectively, then:

$$t_{single\ destination} = \text{node storage capacity}/\min(\Sigma^{cluster} bf_{recovery}, b)$$

$$t_{multiple\ destinations} = \text{node storage capacity}/\Sigma^{cluster} bf_{recovery}$$

Figure 1:
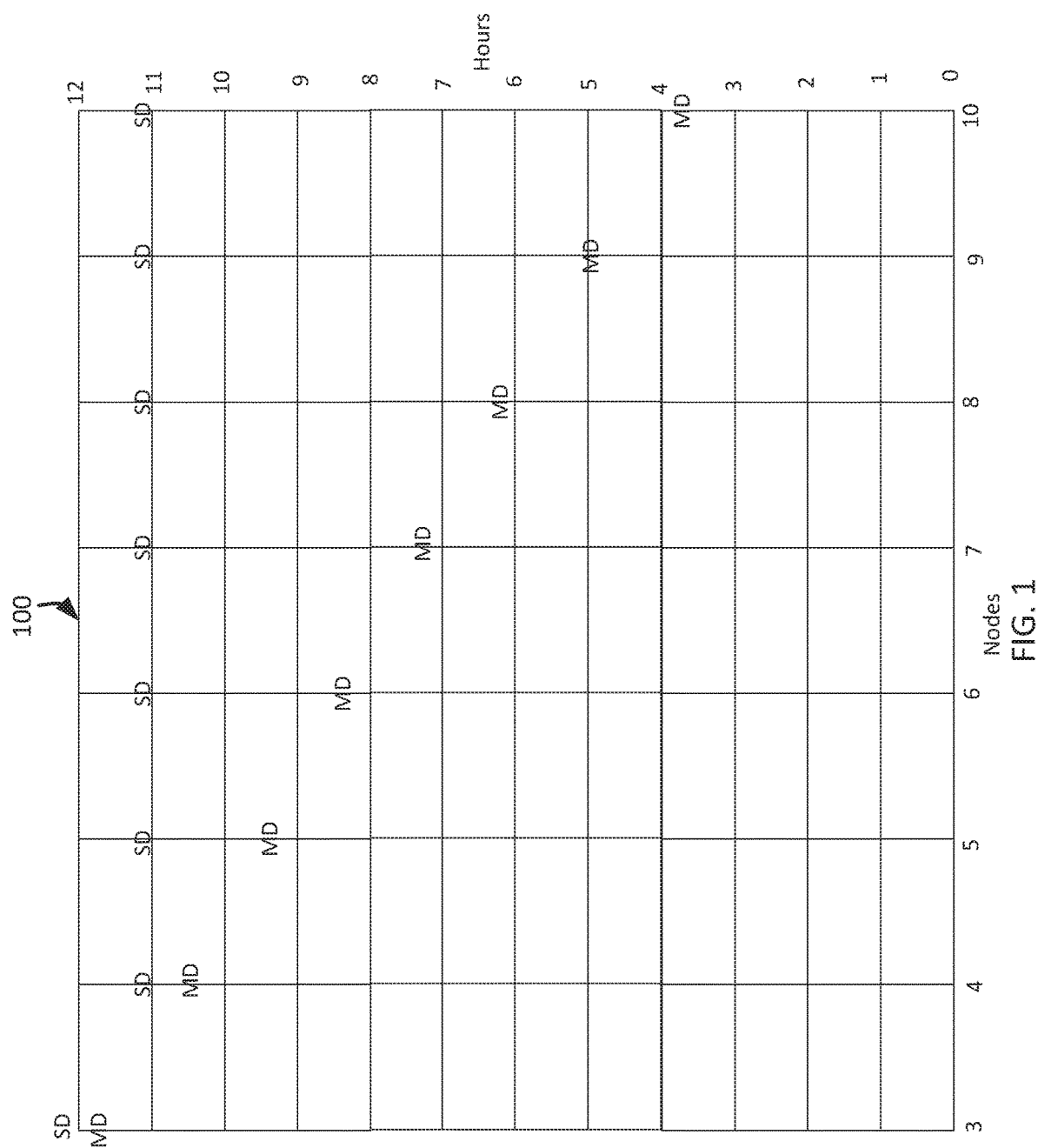
FIG. 1 depicts a graph of recovery time for a cluster of nodes.

The formulas above are used to graph the time taken for recovery for a single destination (SD) and multiple destinations (MD) as the number of nodes in cluster grows. The parameters used in the FIG. 1 graph are a node storage capacity of 4×4 terabytes (TB), with each storage device have 100 megabytes (MB)/second read and write throughput, and $f_{recovery}=0.3$.

For distributed database systems that restrict replica placements by constraints such as racks, the source and destination sets will no longer consist of every node in the cluster. In such cases, the data must be recovered on the same constrained set (such as a rack) as the failed node. If physical bandwidth constraints exist between given replica sets, such as inter-rack bandwidth, the recovery process will consist of sending data across such physical bandwidths. These bandwidths could bottleneck the net recovery bandwidth. For a cluster set up that is symmetric in terms of nodes and racks, each rack has the same number of nodes, and all nodes have the same bandwidth and storage capacity. Let $b_{node}$ be the full duplex bandwidth of a single node, $b_{rack}$ be the full duplex inter-rack bandwidth, $f_r$ be the fraction of bandwidth used in recovery, $R_{source}$ be the source rack, and $R_{destination}$ be the destination rack for the recovery. If $t_{single\ destination}$ and $t_{multiple\ destinations}$ are the times in seconds to recover from a single node failure, for a single destination and multiple destinations, respectively, then:

$$t_{single\ destination} = \text{node storage capacity}/\min(\min(\Sigma^{Resource} b_{node} f_r, b_{rack} f_r), b_{node})$$

$$t_{multiple\ destinations} = \text{node storage capacity}/\min(\min(\Sigma^{Resource} b_{node} f_r, b_{rack} f_r), \Sigma^{Rdestination} b_{node} f_r)$$

Figure 2:
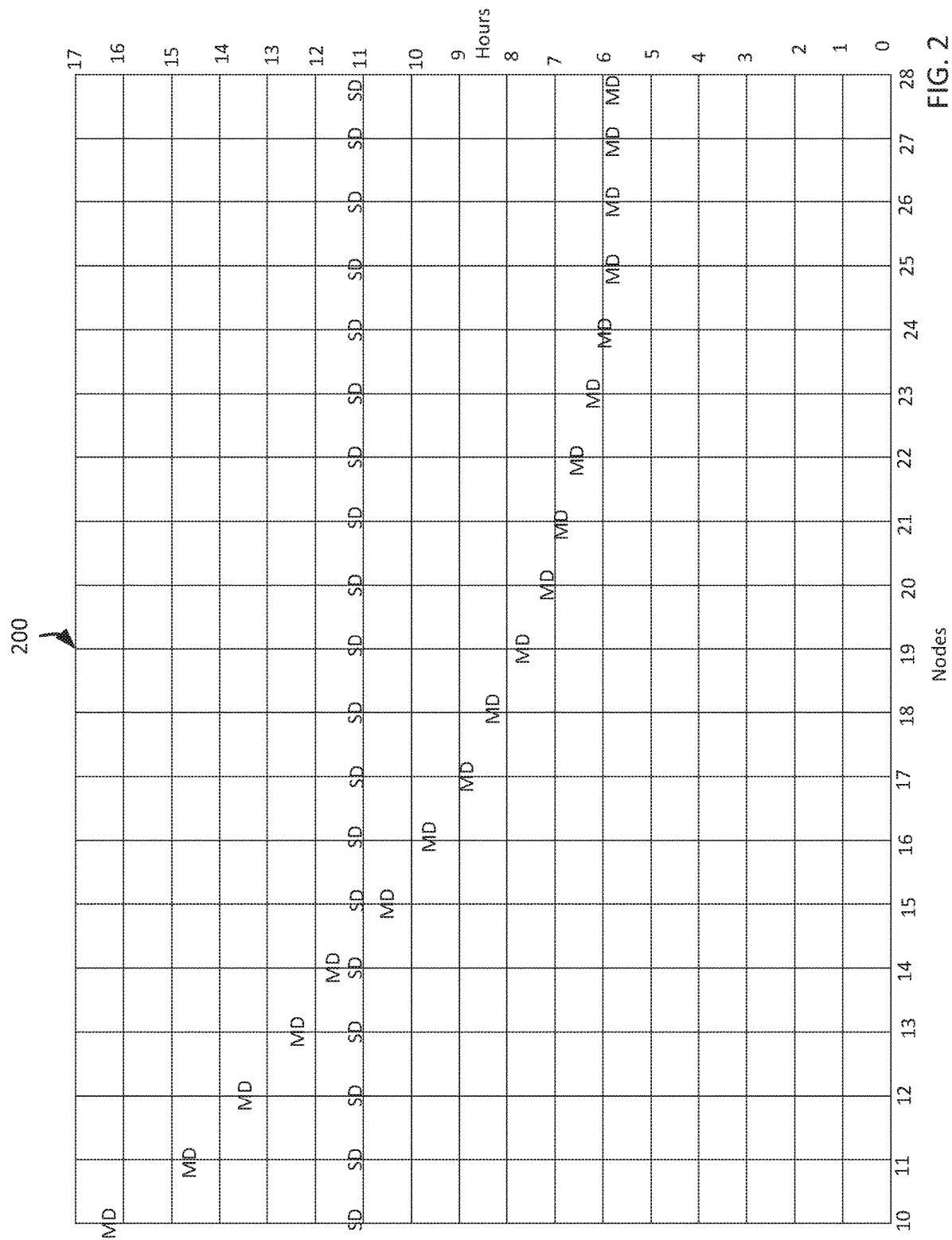
FIG. 2 depicts a graph of recovery time for a cluster of nodes for distributed storage reservation for recovering distributed data, in an embodiment.

The formulas above are used to graph the time taken for recovery for a single destination (SD) and multiple destinations (MD) as the number of nodes per fault domain (such as a rack) grows. The parameters used in the FIG. 2 graph 200 are a node storage capacity of 4×4 TB, with each storage device having 100 MB/seconds read and write throughput, $f_{recovery}=0.3$, and an inter-rack bandwidth of 10 gigabytes (GB)/s.

However, due to the storage capacity related constraints like the minimum free storage capacity, or the "storage capacity high-water mark," in a cluster of nodes that triggers the expansion of the cluster, data is almost always recovered to only one new node. The storage capacity high-water mark is set based on considerations for the amount of time needed to migrate data in an expanding cluster, as well as the rate at which the data may be filled by primary input/output (I/O) operations. The existence of this storage capacity high-water mark may result in the minimum free storage capacity in a cluster of nodes being, at any time, much lower than the storage capacity needed to recover a failed node's data. For example, when each node in a cluster of 10 nodes is using 6 TB (75%) of its 8 TB storage capacity, the failure of 1 node results in the 9 remaining nodes having a combined 18 TB storage capacity (each of the 9 nodes has a 2 TB free storage capacity) to recover the 6 TB of the failed node's data. However, the 9 remaining nodes have only a combined 3.6 TB free storage capacity (each of the 9 nodes has a 0.4 TB free storage capacity until exceeding the 80% high water mark at 6.4 TB), which prohibits the recovery of the 6 TB of the failed node's data. As a result of the policy for such a storage capacity constraint, data storage administrators and/or data recovery software may be forced to recover the data of a failed node to a single new node.

In accordance with embodiments described herein, there are provided methods and systems for distributed storage reservation for recovering distributed data. A total number of connected computers, a storage capacity of each of the connected computers, and a maximum storage capacity of the identified storage capacities of the connected computers are identified. A reserved storage capacity is determined based on the maximum storage capacity and a reduced total number of the connected computers. The reserved storage capacity is provisioned in each of the connected computers. Replicas of a database are stored on the connected computers and on multiple computers, the multiple computers being the same as or different than the connected computers. A connected computer storing a replica of the database is identified as unavailable. A replica of the database is restored from at least one of the computers storing one of the replicas of the database to the reserved storage capacity in each of multiple available connected computers. The replica of the database can be restored from the reserved storage capacity in each of the multiple available connected computers to a provisioned replacement computer of the connected computers in response to identifying the provisioned replacement computer.

For example, a system counts 3 nodes in rack 1, and identifies that each of these 3 nodes has an 8 TB storage capacity, which results in a maximum storage capacity of 8 TB. The system divides the 8 TB of maximum storage capacity by 2 potentially remaining available nodes in rack 1 to recover the data for 1 potentially unavailable node in rack 1, thereby resulting in a reserved storage capacity of 4 TB for each potentially remaining available node. The system provisions an additional 4 TB of reserved storage capacity for each of the 3 nodes of rack 1, which were originally going to be provisioned with 8 TB of storage capacity, resulting in each of these nodes being provisioned with 12 TB of storage capacity. The system stores replicas of a customer relationship management (CRM) database on node 3 of rack 1, on node 2 of rack 2, and on node 1 of rack 3. The system identifies that node 3 of rack 1, which stores a replica of the CRM database, is unavailable. The system restores a replica of the CRM database, from the replicas of the CRM database stored on node 2 of rack 2 and node 1 of rack 3, to the 4 TB of reserved storage capacity on each of node 1 of rack 1 and node 2 of rack 1, the remaining available nodes of rack 1. The system can execute a background operation that restores a replica of the CRM database from the 4 TB reserved storage capacities of node 1 of rack 1 and node 2 of rack 1 to a newly provisioned node 3 of rack 1, which replaces the unavailable node 3 of rack 1. The reserved storage capacity in each available node ensures that the available nodes will have sufficient storage space for recovering an unavailable node's data, without infringing on the capacity related constraints and policies. The data recovery to multiple nodes decreases the recovery time and hence reduces the probability of data loss. The system can also use pseudo nodes to provide a data recovery to multiple nodes, as described below.

Methods and systems are provided for distributed storage reservation for recovering distributed data. First, a method for distributed storage reservation for recovering distributed data will be described with reference to example embodiments. Then example systems for distributed storage reservation for recovering distributed data will be described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 3:
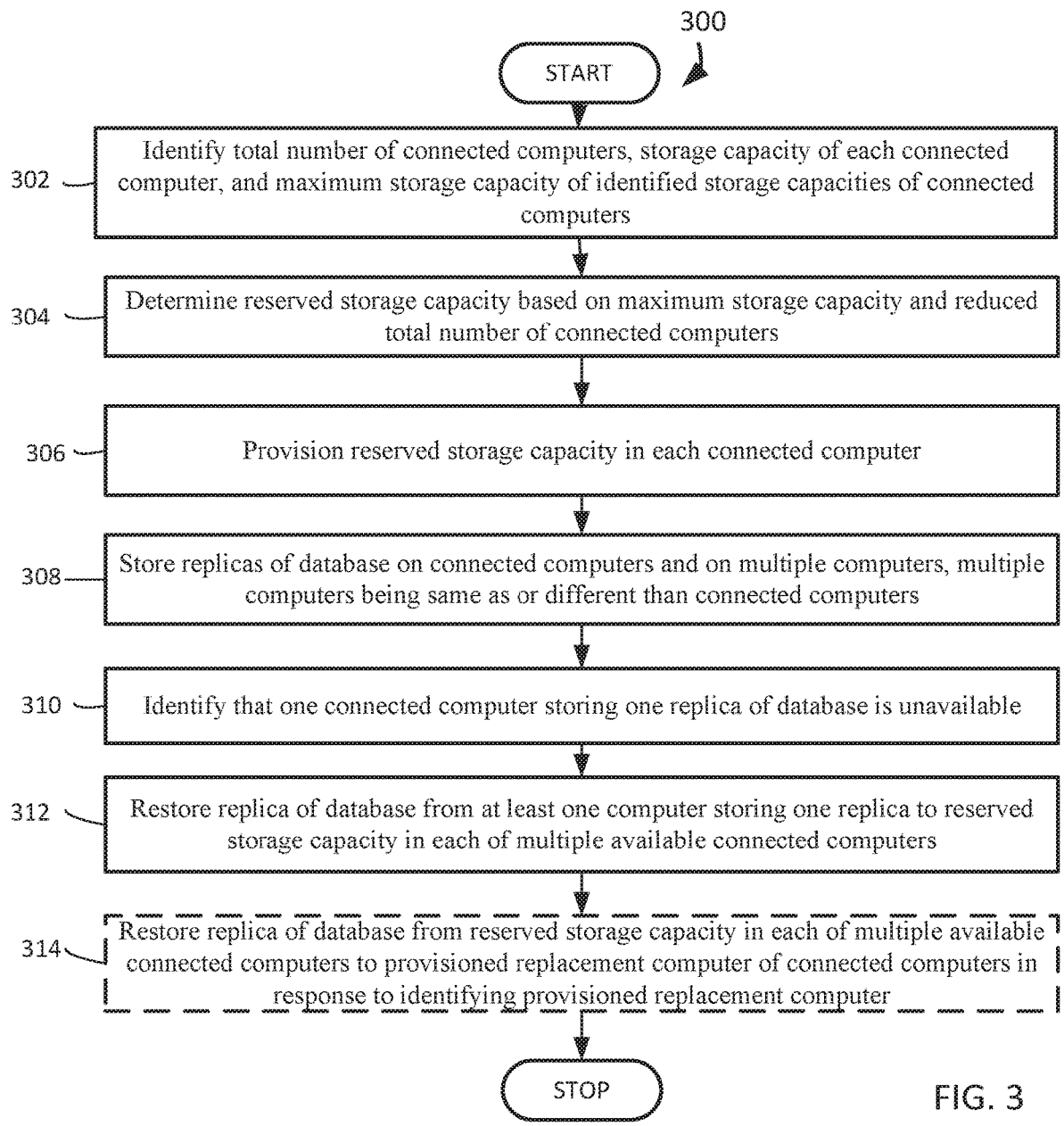
FIG. 3 depicts an operational flow diagram illustrating a high-level overview of a method for distributed storage reservation for recovering distributed data, in an embodiment.

FIG. 3 depicts an operational flow diagram illustrating a high-level overview of a method 300 for distributed storage reservation for recovering distributed data. The method 300 may be implemented on either a centralized computing platform or in parallel on a distributed computing platform.

Figure 4:
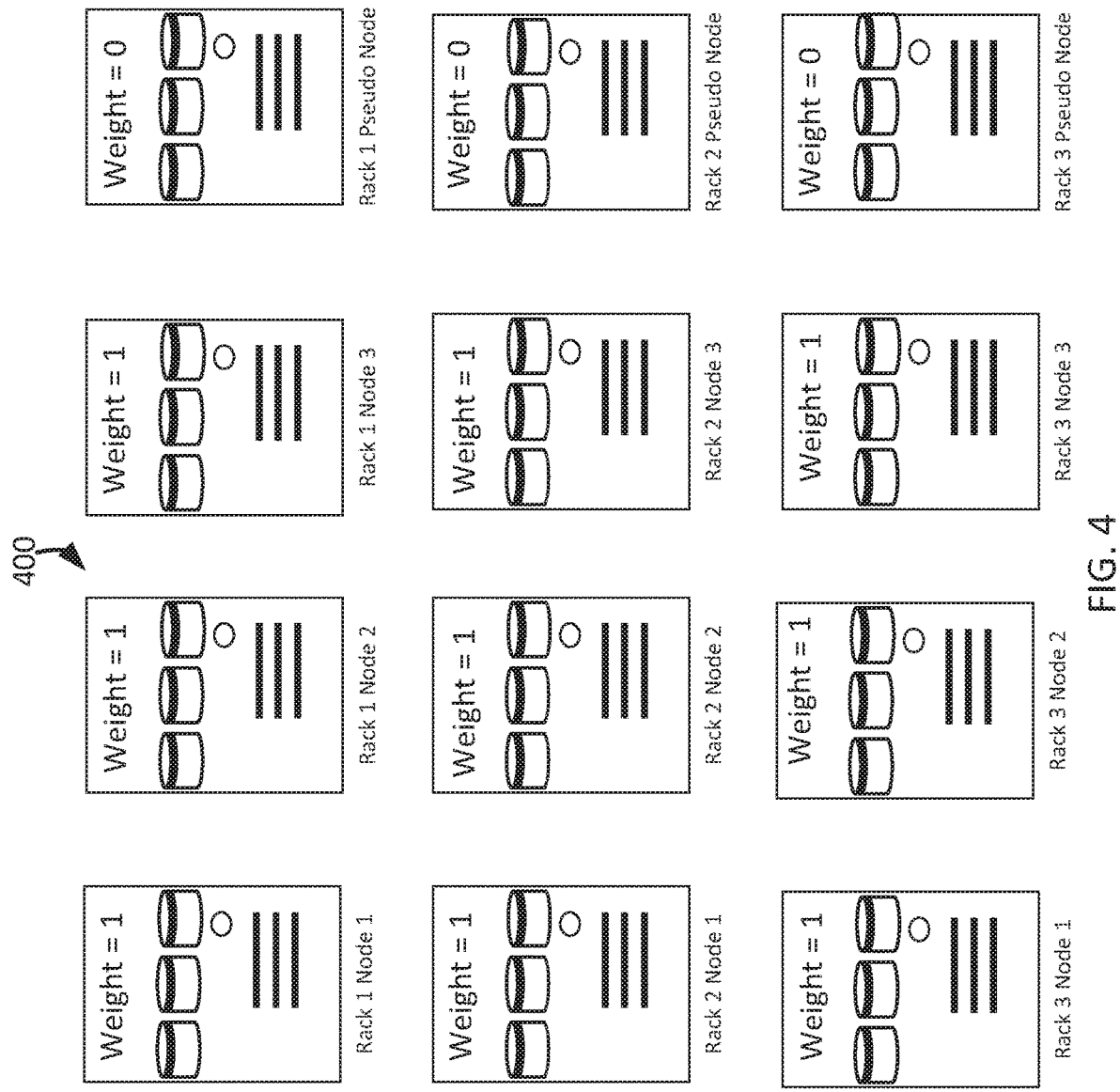
FIGS. 4, 5, 6A, and 6B illustrate block diagrams of examples of environments for distributed storage reservation for recovering distributed data, in an embodiment.

A total number of connected computers, a storage capacity of each of the connected computers, and a maximum storage capacity of the identified storage capacities of the connected computers are identified, box 302. The system counts the number of connected computers and determines the maximum individual storage of the connected computers to determine how much storage will be reserved in each connected computer to enable multiple destination computers during recovery of an unavailable computer's data. For example, and without limitation, this can include the system counting 3 nodes in rack 1, identifying that each of the 3 nodes in rack 1 has an 8 TB storage capacity, and identifying a maximum storage capacity of 8 TB. Although this example describes each connected computer as having the same amount of storage capacity, the system can identify the maximum individual storage capacity for connected computers that have different storage capacities, such as the 8.1 TB storage capacity for one of the connected computers while the other connected computers each have storage capacities of 8 TB. The system identifies the maximum individual storage capacity of the connected computers to ensure that sufficient storage capacity is reserved in the remaining available connected computers even if the connected computer with the largest storage capacity becomes unavailable. An example of an environment that includes 3 nodes in each rack is depicted in FIG. 4 and described below in reference to FIG. 4. Although this example describes identifying the total number of connected computers that share a point of failure, the system can identify the total number of connected computers that do not share a point of failure. For an alternative example, the system counts 10 nodes in a cluster, identifies that each of the 10 nodes in the cluster has an 9 TB storage capacity, and identifies a maximum storage capacity of 9 TB. While in the preceding example the connected computers were nodes in a rack, in this alternative example the connected computers are nodes in a cluster. A total number can be a full count. A connected computer can be an electronic device for storing and processing data that is related to another electronic device for storing and processing data. A storage capacity can be a retention amount for retrievable computer data. An identified storage capacity can be a retention amount for retrievable computer data that is recognized. A maximum storage capacity can be a retention amount for retrievable computer data that is the largest in a group of retention amounts for retrievable computer data.

After counting the total number of connected computers and identifying the maximum individual storage capacity for the connected computers, a reserved storage capacity is determined based on the maximum storage capacity and a reduced total number of the connected computers box 304. The system calculates how much storage will be reserved in each connected computer to enable multiple destination computers during recovery of an unavailable computer's data. By way of example and without limitation, this can include the system dividing the maximum storage capacity of 8 TB for the 3 nodes in rack 1 by 2 potentially remaining nodes in rack 1 to recover the data for 1 potentially failed node in rack 1, thereby resulting in a reserved storage capacity of 4 TB for each of the 2 potentially available nodes in rack 1. In an alternative example, the system divides the maximum storage capacity of 9 TB for the 10 nodes in the cluster by 9 potentially remaining nodes in the cluster to recover the data for 1 potentially failed node in the cluster, thereby resulting in a reserved storage capacity of 1 TB for each of the 10 potentially available nodes in the cluster. The system divides the storage capacity for each connected computer by a number less than the total number of connected computers to ensure that sufficient storage capacity is available in the potentially remaining connected computers to recover the data for a number of connected computers that has potentially failed. While the preceding example described a calculation based on one anticipated failure among the connected computers, the calculation may be based on any number of anticipated failures among the connected computers, such as based on 2 anticipated failures among the connected computer. The number of anticipate failures can be predetermined by system code and/or configure by a system administrator, such as the system code being based on a default value of one anticipate failure in the connected computers and a system administrator modifying the number of anticipate failures in the connected computers to the value of two.

Although the simplified rack example describes reserving 4 TB for 8 TB in each node, which is 50% relative to each node's original 8 TB storage capacity or 33% of each node's expanded 12 TB storage capacity, the percentage relative to each node's storage capacity that is to be reserved may be significantly less in a more realistic example. For example, if each of 9 nodes in a rack has a storage capacity of 8 TB, the system divides 8 TB of storage capacity by 8 potentially remaining nodes (the 9 available nodes in the rack minus 1 potentially failed node) to result in a reserved storage capacity of 1 TB for each potentially remaining node in the rack, which is only 12.5% (1 TB divided by 8 TB) relative to the storage capacity of each potentially remaining node. A reserved storage capacity can be retention amount for retrievable computer data that is kept for a special purpose. A reduced total number is a count that is less than a full count.

Following the calculation of the reserved storage capacity, the reserved storage capacity is provisioned in each of the connected computers, box 306. The system reserves sufficient storage in each connected computer to enable multiple destination computers during recovery of an unavailable computer's data. In embodiments, this can include the system provisioning an additional 4 TB of reserved storage capacity for each of the 3 nodes of rack 1, which were originally going to be provisioned with 8 TB of storage capacity, resulting in each of these 3 nodes in rack 1 being provisioned with 12 TB of storage capacity. In an alternative example, the system provisions an additional 1 TB of reserved storage capacity for each of the 10 nodes in the cluster, which were originally going to be provisioned with 9 TB of storage capacity, resulting in each of these 10 nodes in the cluster being provisioned with 10 TB of storage capacity. The reserved storage capacity in each of the connected computers may be an additionally provisioned storage capacity in each of the connected computers and/or an existing storage capacity in each of the connected computers. For example, the system provisions 4 TB of reserved storage capacity from each node's 8 TB of existing storage capacity. In an alternative example, the system provisions 1 TB of reserved storage capacity from each node's 9 TB of existing storage capacity. An additionally provisioned storage capacity can be a supplied extra retention amount for retrievable computer data. An existing storage capacity can be a current operating retention amount for retrievable computer data.

In addition to provisioning the reserved storage capacity, replicas of a database are stored on the connected computers and on multiple computers, the multiple computers being the same as or different than the connected computers, box 308. The system distributes replicas of a computer's data that may be recovered to multiple destination computers. For example, and without limitation, this can include the system storing replicas of a CRM database on node 3 of rack 1, on node 2 of rack 2 and on node 1 of rack 3. In an alternative example, the system stores replicas of a CRM database on cluster node 3, on cluster node 5, and on cluster node 8. Although these examples describe storing an entire replica of database on a single node, the replicas may be stored as fragments on multiple nodes. For example, the system stores the first half of a first replica of the CRM database on node 2 of rack 1, the second half of the first replica of CRM database on node 3 of rack 1, the first quarter of a second replica of the CRM database on node 1 of rack 2, the remaining three-quarters of the second replica of the CRM database on node 2 of rack 2, the first two-thirds of a third replica of the CRM database on node 1 of rack 3, and the remaining third of the third replica of the CRM database on node 3 of rack 3. In an alternative example, the system stores the first half of the first replica of CRM database on cluster node 2, the second half of the first replica of the CRM database on cluster node 3, the first half of the second replica of the CRM database on cluster node 4, the second half of the second replica of the CRM database on cluster node 5, the first half of the third replica of the CRM database on cluster node 7, and the second half of the third replica of the CRM database on cluster node 8. The computers can share at least one other point of failure that differs from the point of failure shared by the connected computers. For example, node 3 of rack 1, node 2 of rack 2, and node 1 of rack 3 each have a different point of failure because these nodes are on different racks. In an alternative example, cluster node 3, cluster node 5, and cluster node 8 each have a different point of failure because these nodes are isolated in the cluster from each other. A database can be a structured set of information stored in a computer. A replica can be a copy. A computer can be an electronic device for storing and processing data.

Having stored replicas of a database on computers, a connected computer storing a replica of the database is identified as unavailable, box 310. The system identifies that a connected computer storing a copy of the database is no longer available to be accessed by an end user. By way of example and without limitation, this can include the system identifying that node 3 of rack 1, which stores a replica of the CRM database, is unavailable. In an alternative example, the system identifies that cluster node 3, which stores a replica of the CRM database, is unavailable. Unavailable can be the state of being inaccessible by an end user.

Following the identification that a computer storing a replica of the database is unavailable, a replica of the database is restored from at least one of the computers storing one of the replicas of the database to the reserved storage capacity in each of multiple available connected computers, box 312. The system recovers an unavailable computer's data to multiple destination computers. In embodiments, this can include the system restoring a replica of the CRM database, from the replicas of the CRM database stored on node 2 of rack 2 and node 1 of rack 3, to the 4 TB of reserved storage capacity on node 1 of rack 1 and node 2 of rack 1, the remaining available nodes of rack 1. In an alternative example, system restores a replica of the CRM database, from the replicas of the CRM database stored on cluster node 5 and cluster node 8, to the 1 TB of reserved storage capacity on cluster nodes 1, 2, and 4-10, the remaining available cluster nodes. The recovery of the database from the source nodes may be by fragments of the database replicas, such as recovering the first half of the first replica of the CRM database from node 2 of rack 2 and as recovering the second half of the second replica of the CRM database from node 1 of rack 3. When a computer storing the database is identified as unavailable, the cluster of interconnected computers is in a degraded state because subsequent losses of computer availability may threaten the availability of data and or create the risk of data loss. An available connected computer can be a networked electronic device for storing and processing data that can currently be used by an end user.

The system may be applied to a distributed object and block storage platform, such as CEPH, that uses a random placement algorithm, such as CRUSH, to map objects to the cluster nodes' storage devices. Such a random placement algorithm can execute pseudo random placement based on a given storage topology known as a cluster map, such as a CRUSH map. The random placement algorithm can balance the storage distribution of data in a desirable way, by balancing the data storage distribution according to the weights of nodes in the cluster map. A pseudo node, which can be a mock network computer that functions only as a network computer for mapping purposes, may appear on the cluster map as a node bucket with a data storage distribution weight of 0, and may be mapped as the parent node for the storage devices of all other nodes in the defined fault domain, such as a rack.

Figure 5:
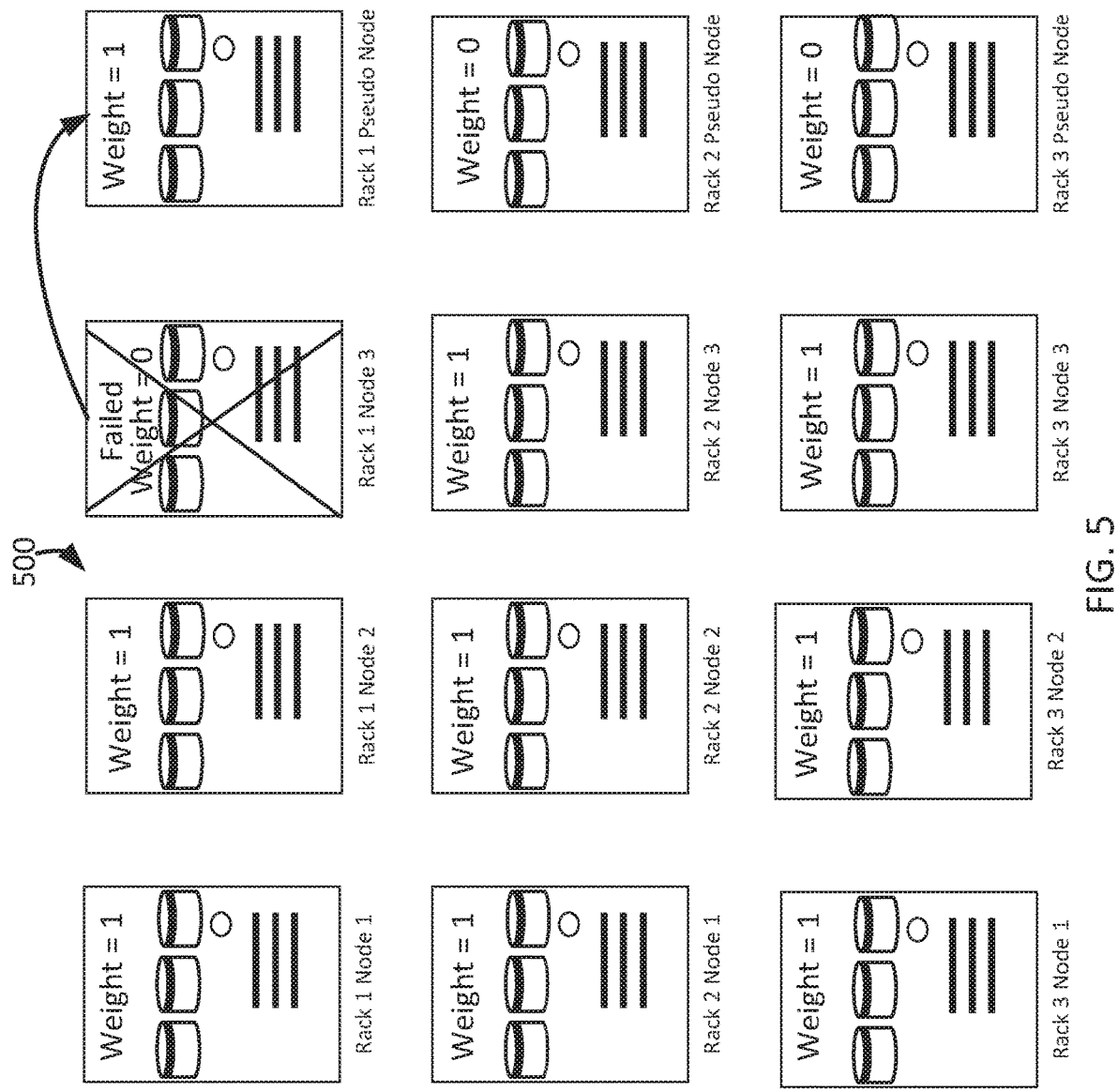

Identifying that a connected computer storing a replica of the database is unavailable may include assigning an identifier of the unavailable connected computer to an identifier of a pseudo computer of the connected computers, and assigning a data storage distribution weight of the unavailable connected computer to a data storage distribution weight of the pseudo computer. For example, after node 3 of rack 1 fails, the system assigns the failed node's identifier to the pseudo node of rack 1, and assigns the failed node's data storage distribution weight of 1 to the pseudo node of rack 1. FIG. 5 depicts an example of a pseudo node assuming the identifier of a failed node and the failed node's data storage distribution weight, which is described below in reference to FIG. 5. An identifier can be a sequence of characters used to refer to an element. A pseudo computer can be a mock electronic device that functions only as an electronic device for mapping purposes. A data storage distribution weight can be the relative importance for allocating information for retention on a specific computer.

Figures 6A, 6B:
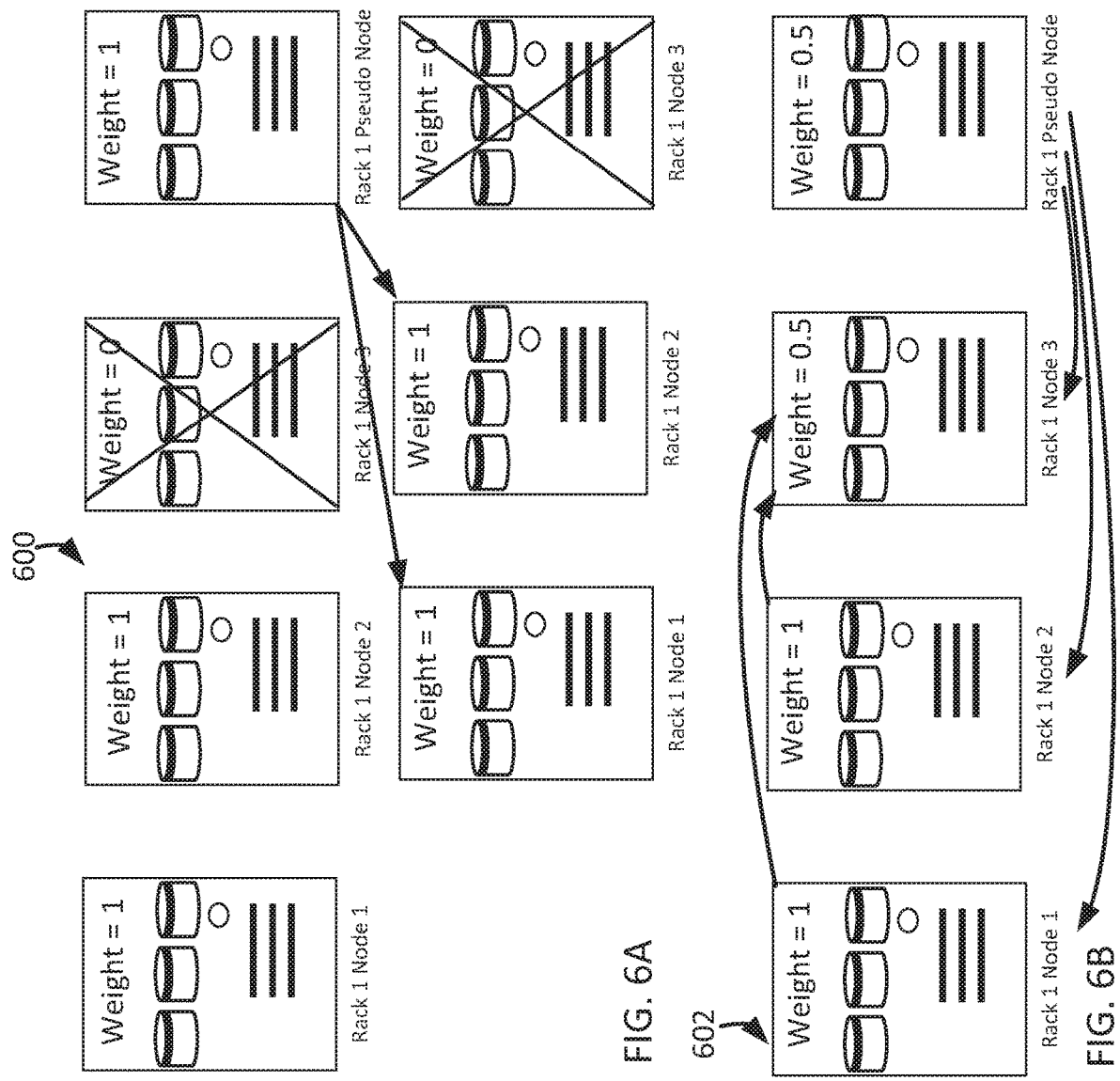
Figure 7:
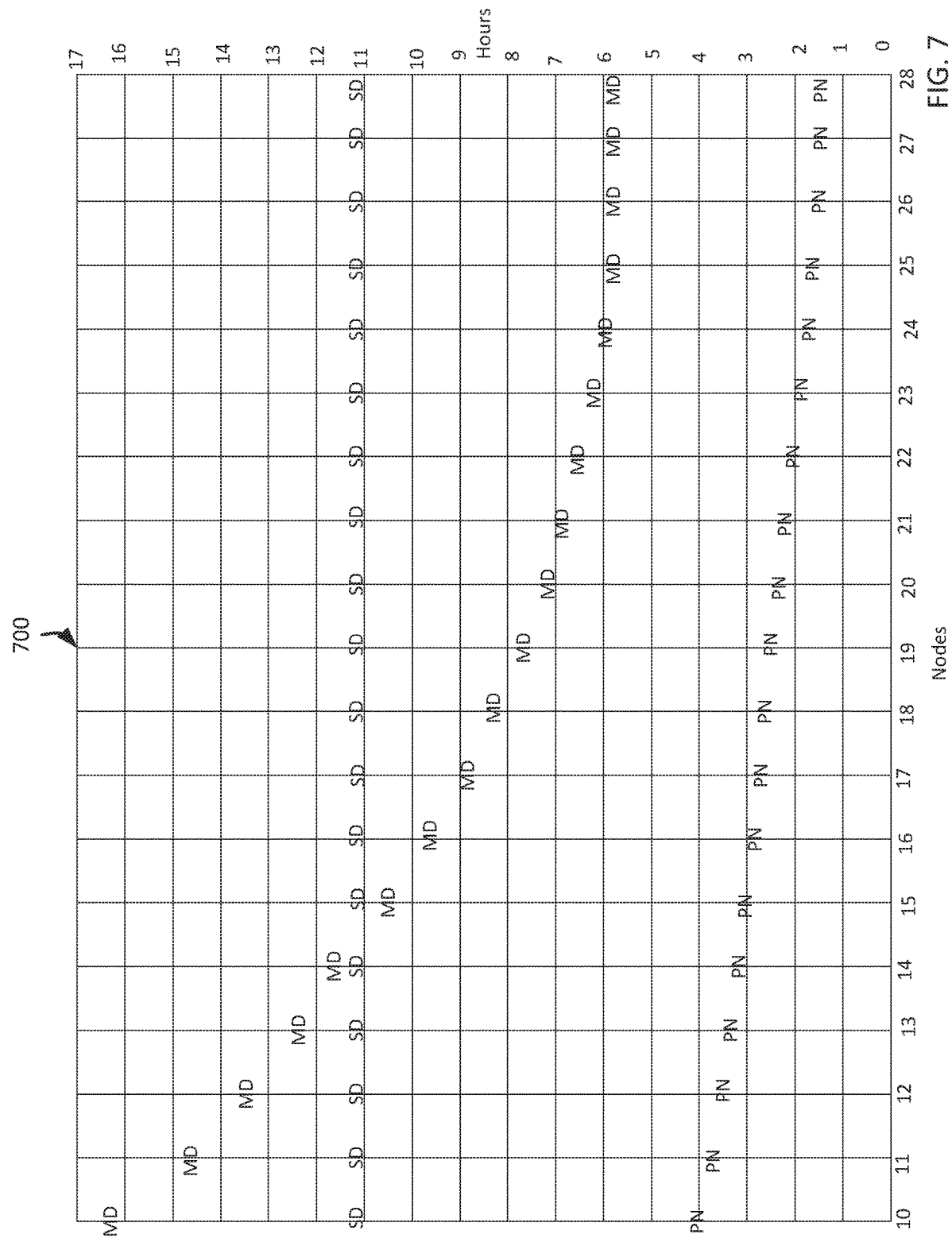
FIG. 7 depicts another graph of recovery time for a cluster of nodes for distributed storage reservation for recovering distributed data, in an embodiment.

Restoring the replica of the database from at least one of the computers storing one of the replicas may include mapping data stored by the unavailable connected computer to a pseudo computer of the connected computers, mapping data mapped to the pseudo computer to the multiple available connected computers, and assigning a corresponding data storage distribution weight to each of the multiple available connected computers, each data storage distribution weight being based on an available storage capacity of a corresponding available connected computer. For example, the system maps a replica of the CRM database, which was stored by the failed node 3 of rack 1, to the pseudo node of rack 1, and then maps the replica of the CRM database to the pseudo node's children nodes, which are node 1 of rack 1, node 2 of rack 1, and the failed node 3 of rack 1. FIG. 6A depicts initially remapping the data originally stored by the failed node's storage devices to a pseudo node, and then subsequently remapping the data to the available nodes' storage devices in the defined fault domain, as described below in reference to FIG. 6A. The weight of each of the pseudo node's children (all storage devices of the available nodes) may be proportional to the corresponding amount of reserve capacity. For example, if each of 10 available nodes has a weight of 1 and 1 storage device, then each child storage device of the pseudo node has a data storage distribution weight of 0.1. In this way, the recovery data is distributed according to the data storage distribution weight of the available nodes. Data can be the quantities, characters, or symbols on which operations are performed by a computer, being stored and transmitted in the form of electrical signals and recorded on magnetic, optical, or mechanical recording media. Available storage capacity can be retention amount for retrievable computer data that may be currently used. Since multiple nodes are participating in both generating the recovered data and storing the recovered data, the cluster of nodes returns from the degraded state to the normal state in a recovery that is relatively the fastest recovery, as depicted in FIG. 7's graph 700 and described below in reference to FIG. 7.

After the provisioning of a replacement computer is identified in the connected computers, the replica of the database can be restored from the reserved storage capacity in each of the multiple available connected computers to a provisioned replacement computer of the connected, box 314. The system can restore an unavailable computer's replacement computer from multiple computers that were destination computers during recovery of the unavailable computer's data. For example, and without limitation, this can include the system executing a background operation that restores the replica of the CRM database from the 4 TB reserved storage capacity of each of node 1 of rack 1 and node 2 of rack 1 to the newly provisioned node 3 of rack 1, which replaces the failed node 3 of rack 1. In an alternative example, the system executes a background operation that restores the replica of the CRM database from the 1 TB reserved storage capacity of each of cluster nodes 1, 2, and 4-10 to the newly provisioned cluster node 3, which replaces the failed cluster node 3.

Restoring the replica of the database to the provisioned replacement computer can include increasing a data storage distribution weight of the provisioned replacement computer and decreasing a data storage distribution weight of the pseudo computer of the connected computers. For example, the system gradually increases the data storage distribution weight of the newly provisioned replacement node 3 of rack 1 from 0 to 0.5 to 1, while gradually decreasing the data storage distribution weight of the pseudo node of rack 1 from 1 to 0.5 to 0. FIG. 6B depicts increased and decreased data storage distribution weights for restoring a database to a newly provisioned replacement computer, which is described below in reference to FIG. 6B. A provisioned replacement computer can be an electronic device for storing and processing data that is supplied as a substitute for another electronic device for storing and processing data. When the cluster is no longer in a degraded state, after the failed node is replaced by a new node, the system can gradually increase the data storage distribution weight of the new node from 0 to the failed node's previous data storage distribution weight, while gradually decreasing the data storage distribution weight of the pseudo node from the failed node's previous data storage distribution weight to 0. These gradual changes in data storage distribution weights can result in gradual data migration from the nodes which were the only available nodes to the new node. After the data storage distribution weights of the new node and the pseudo node are the previous data storage distribution weight of the failed node and 0 respectively, the cluster is reset to its original state By provisioning a replacement computer to the cluster, and rebalancing the data storage distribution, the reserved storage capacity is freed and available for any future recovery of a failed node's data. The system can provision the replacement computer and rebalance the data in background. Any data that is rebalanced is first migrated to a new storage location and then freed from the old storage location. Most of the cluster of connected computers are never at the peak I/O bandwidth utilization, and hence there is recovery bandwidth available. Consequently, the system achieves a more reliable storage cluster and the performance is mostly unaffected.

The method 300 may be repeated as desired. Although this disclosure describes the blocks 302-314 executing in a particular order, the blocks 302-314 may be executed in a different order. In other implementations, each of the blocks 302-314 may also be executed in combination with other blocks and/or some blocks may be divided into a different set of blocks.

FIG. 4 illustrate a block diagram of an example of an environment for distributed storage reservation for recovering distributed data, in an embodiment. As shown in FIG. 4, the system 400 may illustrate a cloud computing environment in which data, applications, services, and other resources are stored and delivered through shared datacenters and appear as a single point of access for end users. The system 400 may also represent any other type of distributed computer network environment in which servers control the storage and distribution of resources and services for different client users.

In an embodiment, the system 400 represents a cloud computing system that includes multiple clients, which are not depicted, and nine nodes and three pseudo nodes that may be provided by a hosting company. Although FIG. 4 depicts the nodes as servers, the nodes may be any type of computer. The clients and the nodes communicate via a network, which is not depicted. Although FIG. 4 depicts the system 400 with three racks that each contain three nodes and one pseudo node, with each node including three storage devices, the system may include any number of racks, each rack may include any number of nodes and any number of pseudo nodes, and each node and each pseudo node may include any number of storage devices. While FIG. 4 depicts each node with a data storage distribution weight of 1 and each pseudo node with a data storage distribution weight of 0, the data storage distribution weights can range from any type of minimum value to any type of maximum value.

FIG. 5 illustrates a block diagram of an example of an environment for distributed storage reservation for recovering distributed data, in an embodiment. The system 500 depicted in FIG. 5 is substantially similar to the system 400 depicted in FIG. 4. The system 500 depicts that the pseudo node of rack 1 assumes both the identifier of the failed node 3 of rack l and the failed node's data storage distribution weight of 1.

FIGS. 6A and 6B illustrate block diagrams of examples of environments for distributed storage reservation for recovering distributed data, in an embodiment. The racks 600 and 602 depicted in FIGS. 6A and 6B are substantially similar to the racks in the system 400 depicted in FIG. 4 and the racks in the system 500 depicted in FIG. 5. The rack 600 depicts that the data originally stored by the storage devices of failed node 3 of rack 1 is initially remapped to the pseudo node of rack 1, and then subsequently remapped to the storage devices of the remaining available nodes in rack 1, which are node 1 of rack 1 and node 2 of rack 1. The rack 602 depicts that the system increased the data storage distribution weight of the newly provisioned replace node 3 of rack 1 from 0 to 0.5, and decreased the data storage distribution weight of the pseudo node of rack 1 from 1 to 0.5, thereby enabling a gradual restoration of the CRM database to the newly provisioned replacement node 3 of rack 1.

FIG. 7 depicts another graph 700 of recovery time for a cluster of nodes for distributed storage reservation for recovering distributed data, in an embodiment. Experiments suggest that the pseudo node (PN) method described above provides the fastest recovery of distributed data compared to the two CEPH recommended methods of recovering distributed data. In the graph 700, SD (single destination) represents the method for replacing an unavailable computer and recovering the unavailable computer's data using only the provisioned replacement computer as the destination.

System Overview

Figure 8:
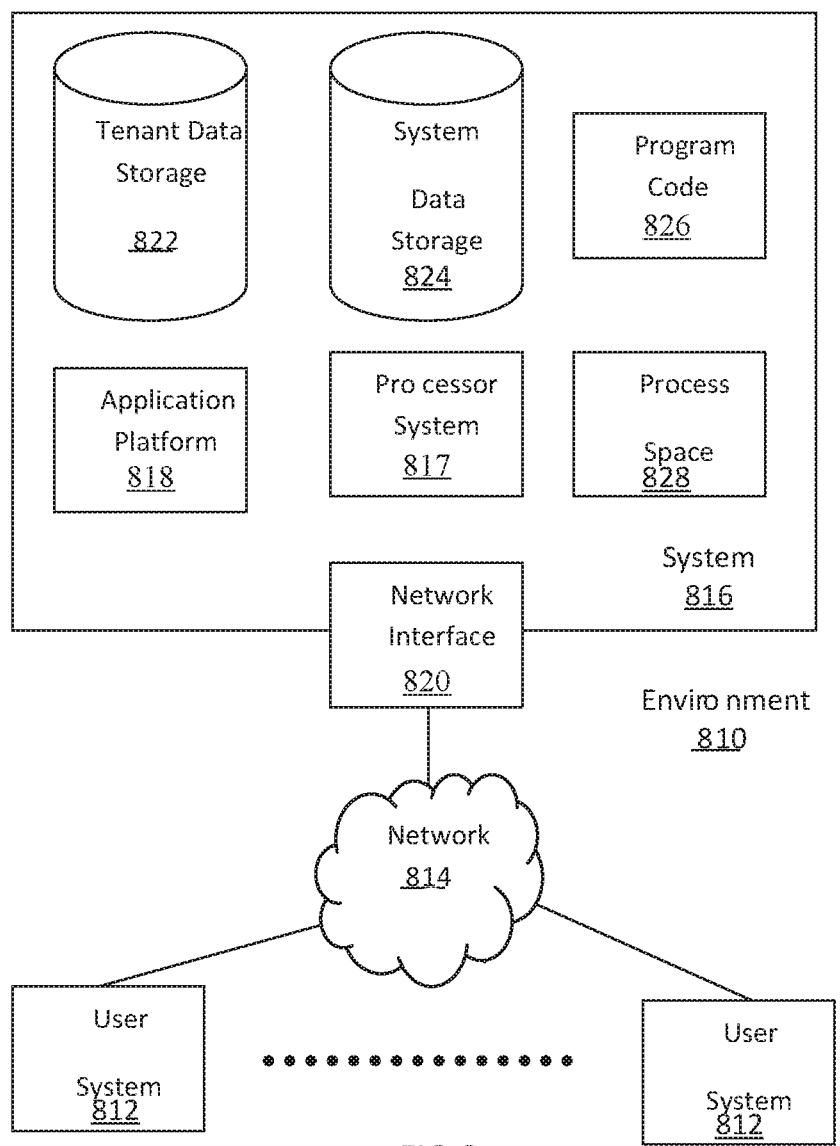
FIG. 8 illustrates a block diagram of an example of an environment wherein an on-demand database service might be used.

FIG. 8 illustrates a block diagram of an environment 810 wherein an on-demand database service might be used. The environment 810 may include user systems 812, a network 814, a system 816, a processor system 817, an application platform 818, a network interface 820, a tenant data storage 822, a system data storage 824, program code 826, and a process space 828. In other embodiments, the environment 810 may not have all of the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a work station, and/or a network of computing devices. As illustrated in FIG. 8 (and in more detail in FIG. 9) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 812 might communicate with the system 816 using TCP/IP and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages and applications available to it from the system 816 over the network 814. Each of the user systems 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 812 and all of its components are operator configurable using applications, such as a browser, including computer code run using a central processing unit such as an Intel Pentium® processor or the like. Similarly, the system 816 (and additional instances of an MTS, where more than one is present) and all of their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 816 is configured to provide webpages, forms, applications, data and media content to the user (client) systems 812 to support the access by the user systems 812 as tenants of the system 816. As such, the system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
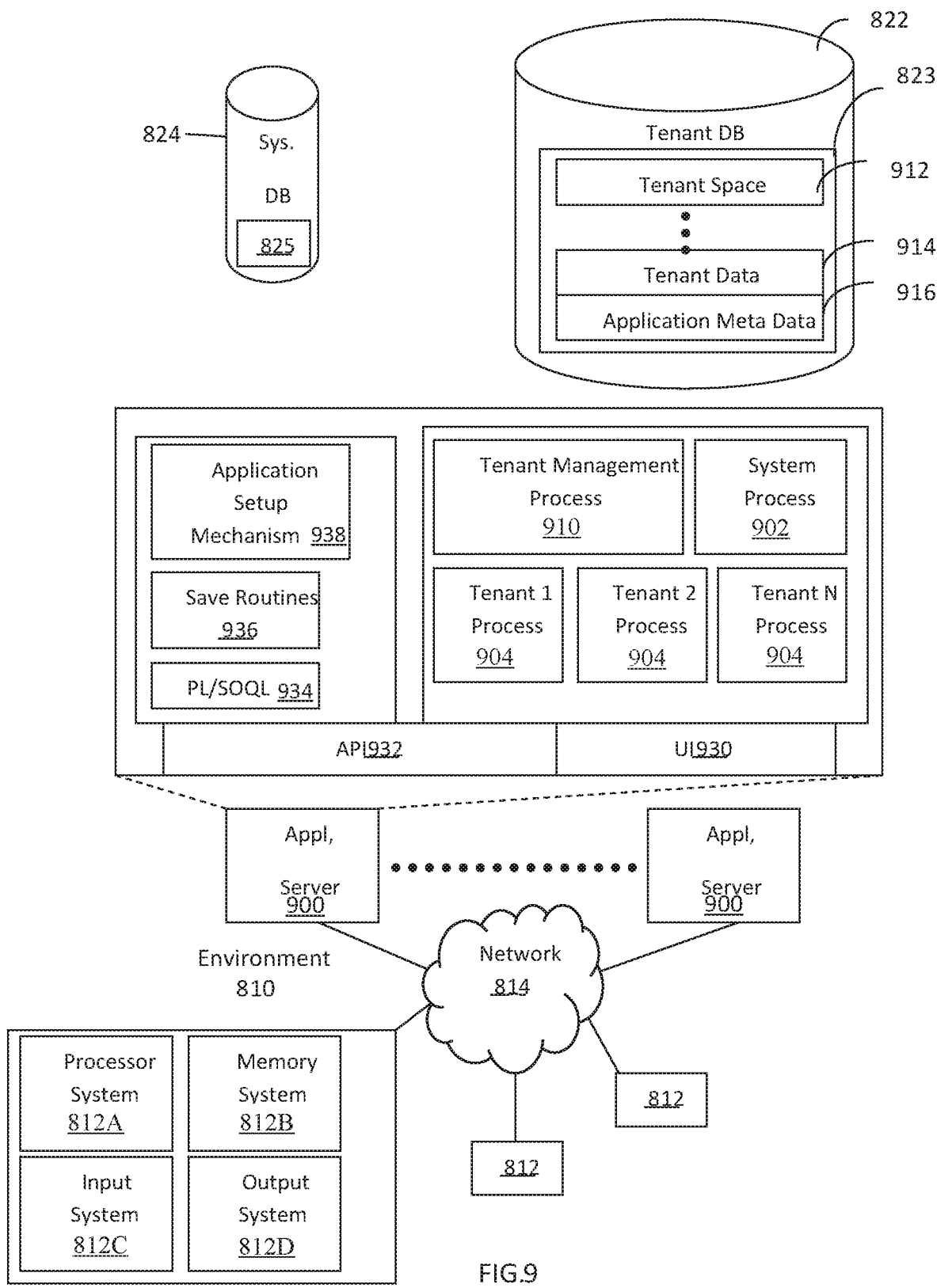
FIG. 9 illustrates a block diagram of an embodiment of elements of FIG. 8 and various possible interconnections between these elements.

FIG. 9 also illustrates the environment 810. However, in FIG. 9 elements of the system 816 and various interconnections in an embodiment are further illustrated. FIG. 9 shows that the each of the user systems 812 may include a processor system 812A, a memory system 812B, an input system 812C, and an output system 812D. FIG. 9 shows the network 814 and the system 816. FIG. 9 also shows that the system 816 may include the tenant data storage 822, the tenant data 823, the system data storage 824, the system data 825, a User Interface (UI) 930, an Application Program Interface (API) 932, a PL/SOQL 934, save routines 936, an application setup mechanism 938, applications servers $900_1$-$900_N$, a system process space 902, tenant process spaces 904, a tenant management process space 910, a tenant storage area 912, a user storage 914, and application metadata 916. In other embodiments, the environment 810 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 812, the processor system 812A may be any combination of one or more processors. The memory system 812B may be any combination of one or more memory devices, short term, and/or long-term memory. The input system 812C may be any combination of input devices, such as one or more keyboards, mice, trackballs, scanners, cameras, and/or interfaces to networks. The output system 812D may be any combination of output devices, such as one or more monitors, printers, and/or interfaces to networks. As shown by FIG. 9, the system 816 may include the network interface 820 (of FIG. 8) implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 823 therein, and the system data storage 824 and the system data 825 therein to serve requests of the user systems 812. The tenant data 823 might be divided into individual tenant storage areas 912, which can be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface and the API 932 provides an application programmer interface to the system 816 resident processes to users and/or developers at the user systems 812. The tenant data and the system data may be stored in various databases, such as one or more Oracle databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 825 and the tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals and progress data, etc., all applicable to that user's personal sales process (e.g., in the tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
identify a total number of connected computers, a storage capacity of each of the connected computers, and a maximum storage capacity of the identified storage capacities of the connected computers;
determine a reserved storage capacity based on the maximum storage capacity and a reduced total number of connected computers;
provision the reserved storage capacity in each of the connected computers;
store a plurality of replicas of a database on a plurality of the connected computers and on a plurality of computers, the plurality of computers being the same as or different than the connected computers;
identify that one of the connected computers storing one of the plurality of replicas of the database is unavailable; and
restore a replica of the database from at least one of the computers storing one of the plurality of replicas to the reserved storage capacity in each of a plurality of available connected computers.

2. The system of claim 1, wherein the reserved storage capacity in each of the connected computers comprises at least one of an additionally provisioned storage capacity in each of the connected computers and an existing storage capacity in each of the connected computers.

3. The system of claim 1, wherein the connected computers share a point of failure, and the plurality of computers share at least one other point of failure.

4. The system of claim 1, wherein identifying that one of the connected computers storing one of the plurality of replicas of the database is unavailable comprises assigning an identifier of the one of the connected computers to an identifier of a pseudo computer of the connected computers, and assigning a data storage distribution weight of the one of the connected computers to a data storage distribution weight of the pseudo computer.

5. The system of claim 1, wherein restoring the replica of the database from at least one-of the computers storing one of the plurality of replicas comprises mapping data stored by the one of the connected computers to a pseudo computer of the connected computers, mapping data mapped to the pseudo computer to the plurality of available connected computers, and assigning a corresponding data storage distribution weight to each of the plurality of available connected computers, each data storage distribution weight being based on an available storage capacity of a corresponding available connected computer.

6. The system of claim 1, comprising further instructions, which when executed, cause the one or more processors to restore the replica of the database from the reserved storage capacity in each of the plurality of available connected computers to a provisioned replacement computer of the connected computers in response to identifying the provisioned replacement computer.

7. The system of claim 6, wherein restoring the replica of the database to the provisioned replacement computer comprises increasing a data storage distribution weight of the provisioned replacement computer and decreasing a data storage distribution weight of a pseudo computer of the connected computers.

8. A computer program product comprising computer-readable program code to be executed by one or more processors when retrieved from a non-transitory computer-readable medium, the program code including instructions to:
identify a total number of connected computers, a storage capacity of each of the connected computers, and a maximum storage capacity of the identified storage capacities of the connected computers;
determine a reserved storage capacity based on the maximum storage capacity and a reduced total number of connected computers;
provision the reserved storage capacity in each of the connected computers;
store a plurality of replicas of a database on a plurality of the connected computers and on a plurality of computers, the plurality of computers being of the same as or different than the connected computers;
identify that one of the connected computers storing one of the plurality of replicas of the database is unavailable; and
restore a replica of the database from at least one of the computers storing one of the plurality of replicas to the reserved storage capacity in each of a plurality of available connected computers.

9. The computer program product of claim 8, wherein the reserved storage capacity in each of the connected computers comprises at least one of an additionally provisioned storage capacity in each of the connected computers and an existing storage capacity in each of the connected computers.

10. The computer program product of claim 8, wherein the connected computers share a point of failure, and the plurality of computers share at least one other point of failure.

11. The computer program product of claim 8, wherein identifying that one of the connected computers storing one of the plurality of replicas of the database is unavailable comprises assigning an identifier of the one of the connected computers to an identifier of a pseudo computer of the connected computers, and assigning a data storage distribution weight of the one of the connected computers to a data storage distribution weight of the pseudo computer.

12. The computer program product of claim 8, wherein restoring the replica of the database from at least one-of the computers storing one of the plurality of replicas comprises mapping data stored by the one of the connected computers to a pseudo computer of the connected computers, mapping data mapped to the pseudo computer to the plurality of available connected computers, and assigning a corresponding data storage distribution weight to each of the plurality of available connected computers, each data storage distribution weight being based on an available storage capacity of a corresponding available connected computer.

13. The computer program product of claim 8, wherein the program code comprises further instructions to restore the replica of the database from the reserved storage capacity in each of the plurality of available connected computers to a provisioned replacement computer of the connected computers in response to identifying the provisioned replacement computer, wherein restoring the replica of the database to the provisioned replacement computer comprises increasing a data storage distribution weight of the provisioned replacement computer and decreasing a data storage distribution weight of a pseudo computer of the connected computers.

14. A method comprising:
identifying a total number of connected computers, a storage capacity of each of the connected computers, and a maximum storage capacity of the identified storage capacities of the connected computers;
determining a reserved storage capacity based on the maximum storage capacity and a reduced total number of connected computers;
provisioning the reserved storage capacity in each of the connected computers;
storing a plurality of replicas of a database on a plurality of the connected computers and on a plurality of computers, the plurality of computers being the same as or different than the connected computers;
identifying that one of the connected computers storing one of the plurality of replicas of the database is unavailable; and
restoring a replica of the database from at least one of the computers storing one of the plurality of replicas to the reserved storage capacity in each of a plurality of available connected computers.

15. The method of claim 14, wherein the reserved storage capacity in each of the connected computers comprises at least one of an additionally provisioned storage capacity in each of the connected computers and an existing storage capacity in each of the connected computers.

16. The method of claim 14, wherein the connected computers share a point of failure, and the plurality of computers share at least one other point of failure.

17. The method of claim 14, wherein identifying that one of the connected computers storing one of the plurality of replicas of the database is unavailable comprises assigning an identifier of the one of the connected computers to an identifier of a pseudo computer of the connected computers, and assigning a data storage distribution weight of the one of the connected computers to a data storage distribution weight of the pseudo computer.

18. The method of claim 14, wherein restoring the replica of the database from at least one-of the computers storing one of the plurality of replicas comprises mapping data stored by the one of the connected computers to a pseudo computer of the connected computers, mapping data mapped to the pseudo computer to the plurality of available connected computers, and assigning a corresponding data storage distribution weight to each of the plurality of available connected computers, each data storage distribution weight being based on an available storage capacity of a corresponding available connected computer.

19. The method of claim 14, further comprising restoring the replica of the database from the reserved storage capacity in each of the plurality of available connected computers to a provisioned replacement computer of the connected computers in response to identifying the provisioned replacement computer.

20. The method of claim 19, wherein restoring the replica of the database to the provisioned replacement computer comprises increasing a data storage distribution weight of the provisioned replacement computer and decreasing a data storage distribution weight of a pseudo computer of the connected computers.

* * * * *